United States Patent

[11] 3,607,476

[72] Inventors René Besamat;
Philippe Basseville, both of Montreuil-sous-Bois, France

[21] Appl. No. 743,410
[22] Filed July 9, 1968
[45] Patented Sept. 21, 1971
[73] Assignee L.C.C.-C.I.C.E.-Compagnie Europeenne de Composants Electriques
[32] Priority July 19, 1967
[33] France
[31] 114759

[54] METHOD OF MANUFACTURING THIN FILM CIRCUITS
1 Claim, 8 Drawing Figs.

[52] U.S. Cl. 156/11, 156/3, 117/212, 204/192, 174/68.5
[51] Int. Cl. H05k 1/00, H05k 3/06
[50] Field of Search 156/3, 17, 11; 204/192; 117/201, 212, 217; 174/68.5

[56] References Cited

UNITED STATES PATENTS 3,242,006 3/1966 Gerstenberg 117/201

*Primary Examiner*—Jacob H. Steinberg
*Attorney*—Edwin E. Greigg

ABSTRACT: A method for depositing a tantalum resistor with gold terminals on a substrate, which consists in masking part of the substrate with copper, producing a tantalum coating on the substrate by cathode-sputtering, and exploiting the differences in porosity between the tantalum, directly in contact with the substrate, and that in contact therewith through the medium of copper for removing all the deposits except that corresponding to the desired pattern.

PATENTED SEP 21 1971 3,607,476

METHOD OF MANUFACTURING THIN FILM CIRCUITS

The present invention relates to a process for forming thin film circuits on a substrate.

According to the invention, there is provided a method for forming a tantalum film resistor following a predetermined pattern including lateral terminals on an insulating substrate comprising the following steps: depositing a metal layer on said substrate; eliminating said metal from said layer to lay bare a portion of said substrate along said pattern; covering said layer and said substrate portion with tantalum forming a porous tantalum layer on said metal layer and a compact tantalum layer along said pattern; and removing said porous tantalum layer and said metal layer.

For a better understanding of the invention and to show how the same may be carried into effect, reference will be made to the drawing accompanying the ensuing description and in which.

Figure 1:
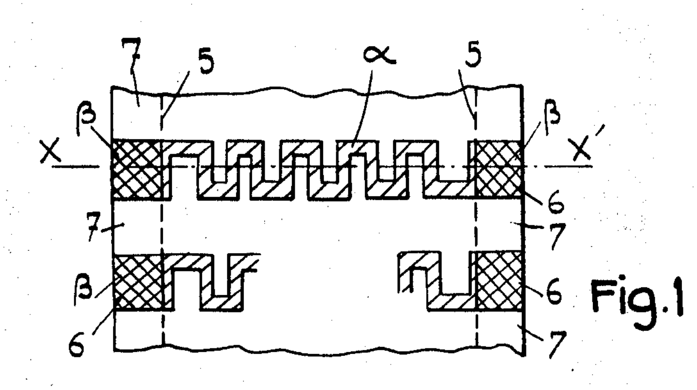
FIG. 1 illustrates a plan view of a tantalum resistance network on a glass or ceramic substrate.

In FIG. 1, the resistor $\alpha$ is made of nitrided tantalum, its extremities $\beta$ being enlarged and gilded. The whole system is arranged on a glass or enameled aluminum substrate 1.

Figure 2:
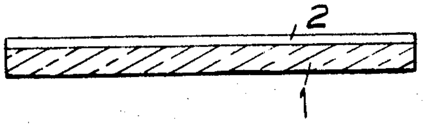
FIGS. 2 to 8 illustrate, in section taken in the plane X—X′ of FIG. 1, various stages of the manufacturing process.
Figure 3:
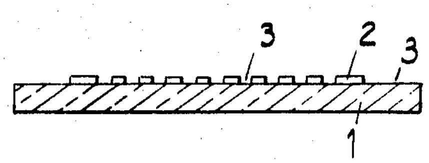

FIG. 2 illustrates the first stage of manufacture. A layer of a metal 2, for example copper vaporized under vacuum, readily affected by reagents, entirely covers a substrate 1. The desired pattern is cut out in this layer using photoresist techniques (FIG. 3). A photographic mask, which reproduces in black, either the desired pattern or the negative of this pattern, according to the type of resist, is used.

The zones 3 at which tantalum or gold are to be deposited, are thus free of copper.

Figure 4:
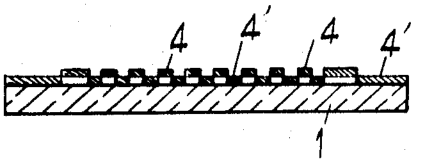

In FIG. 4, the assembly is covered by nitrided tantalum. The deposits 4 cover the copper layer and the deposits 4′ are applied directly to the substrate 1. This is carried out, for example, by using cathode-sputtering techniques.

The metal and the substrate are so selected and so treated that the tantalum deposits 4′ are in compact form and tantalum deposits 4 are porous.

The need for this difference in compactness will be explained hereinafter. It should be noted that the deposited films are formed atom by atom and that, when the atoms achieve a sufficient superficial density, they combine by nucleation into compact agglomerations, whereupon a new film develops upon these agglomerations and in the spaces between them, giving rise to successive nucleations, until the desired thickness is achieved. If this nucleation is inhibited or slowed down, the structure of the metal is porous or fissured. Accordingly, in the present instance, the technique will have to be such as to favour nucleation at the free surface of the substrate 3 and restrict it at the surface of the metal 2. Now, it is well known that nucleation is the better, the weaker are the attractive forces between the condensed atoms and the substrate, i.e., the weaker is the physicochemical reactivity of the two substances concerned. For example, in accordance with one of the features of the invention, the substrate will be a smooth, vitreous body with a very regular surface which has been carefully cleaned of any trace of active chemical agents (alkaline or acid solutions), or a surface which has been chemically reduced or etched by acids, (for example HF or boiling acids). On the contrary, the metal surface 2 will be activated to the maximum (attack by corrosive vapors such as chlorine, bromine, etc. or medium force acids, or weak oxidation). Particularly favorable results have been observed after the production of weak oxidation of the metal (for example in a furnace in air atmosphere at 200° C.), or again after irradiation, before cathode-sputtering, of the surface of the metal by glow-discharge techniques in an argon atmosphere at a pressure of $10^{12}$ mm./Hg., the metal being brought to a negative voltage (thus actually behaving as a cathode in the cathode-sputtering process).

Thus, it has been confirmed that nitrided tantalum, deposited upon an activated metal surface in accordance with the present invention, presents a porous structure due to a relatively delayed nucleation. Of course, the activation of the metal surface must not result in the activation of the exposed substrate surface and the process to be actually selected should be chosen after experimentation, at least as far as the chemical treatment is concerned.

Following this operation, in the zones 4 there will be porous tantalum and in the zones 4′ compact tantalum; it is the latter zones which form the resistor.

The zones $\beta$, which constitute the terminals of the resistors, must then be gilded.

Figure 5:
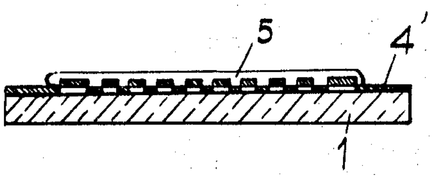

This is done in the following manner:

a. The resistor is covered with a thin layer of non-polymerizable varnish, such as a vinyl varnish 5, applied by silk-screen techniques, the contour of which slightly encroaches on the zones $\beta$ (FIG. 5).

It will be noted that the zones $\beta$ are wide, compared to the resistor strip $\alpha$, and for the aforesaid purpose of varnish application, a rough mask will be used, whose contours, where they cross the zones $\beta$, are not sharply defined, such a mask therefore being cheaper.

b. By evaporating the solvent, the varnish is converted to a plastic film, which exhibits virtually no degassing under vacuum, is resistant to temperatures of up to 140° (for times of up to 30 minutes, for example), but presents a substantial amount of superficial cracking.

Figure 6:
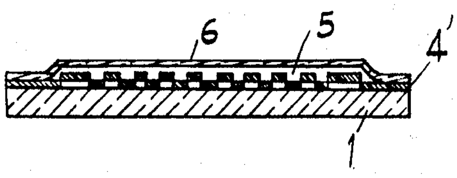
Figure 7:
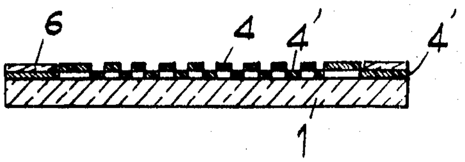
Figure 8:
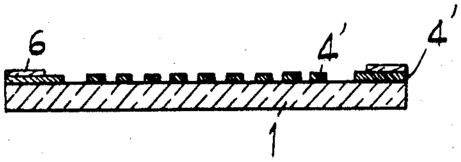

C. The whole is placed in a vacuum bell jar and, over the whole of the substrate, a gold layer (FIG. 6) (preferably preceded by a 100 to 200 A. thick layer of chrome or chrome alloy) is deposited. The gold layer or film may be as much as 1 micron thick and is deposited on the substrate heated to 140° C., so that the rate of nucleation of gold will be rapid on the compact areas 4′ of tantalum, and slow on the others (i.e., on the plastic surface 5 and the porous substrate surfaces 7 which are not covered by the plastic, which, as shown in FIG. 1, separate the zones which are to be soldered).

d. The whole assembly is then immersed in a substance which dissolves the plastic; this plastic, due to the porosity of the covering gold film and due to its own cracked nature, is rapidly dissolved by the solvent, thus exposing the hitherto covered tantalum layer (FIG. 1) and leaving around its original perimeter the gold coated zones 6 and 7.

e. Finally, the whole assembly is subjected to the action of a substance which reacts with the metal 2 (FIG. 8). This action is possible due to the porosity of the gold 7 and of the tantalum deposits 4 on metal 2. The physicochemical nature of said metal is originally responsible for the porous nature of the tantalum 4 and gold 7. Thus, ultimately, after washing, there is nothing left but the network of resistors $\alpha$ of compact tantalum nitrate 4′ and the terminal zones $\beta$, also of compact tantalum and covered with a compact gold film 6 of the same contour, this being the case within the limits of accuracy of the intermediate plastic mask 5, as defined by the broken line in FIG. 1.

Of course the invention is not limited to the embodiment described and shown which is given solely by way of example.

What is claimed, is:

1. A method of forming a tantalum film resistor following a predetermined pattern, including lateral terminals, on a substrate made of glass, comprising the steps of cleaning and polishing said substrate; depositing a layer of copper on said substrate; roughening said layer of copper by etching; eliminating a portion of said copper layer to lay bare a portion of said substrate along said pattern; covering said layer and said substrate with tantalum nitride to form a porous tantalum nitride layer on said copper layer; etching away said porous tantalum nitride layer and said copper layer by covering said pattern to the exclusion of said terminals with a thin layer of polymerizable varnish; evaporating the solvent of the varnish, thus forming a plastic film presenting an amount of superficial cracking; depositing on said film and on said terminals a gold coating and removing said plastic film by dissolving it so as to remove the superposed gold layers.